Aug. 4, 1942.   C. E. COOK   2,291,694
SAFETY BOLSTER
Filed Nov. 22, 1940   2 Sheets-Sheet 1

C. E. COOK
INVENTOR.

BY Lester B. Clark,
ATTORNEY.

Aug. 4, 1942.  C. E. COOK  2,291,694

SAFETY BOLSTER

Filed Nov. 22, 1940  2 Sheets-Sheet 2

C. E. COOK
INVENTOR.

Lester B. Clark
ATTORNEY.

Patented Aug. 4, 1942

2,291,694

UNITED STATES PATENT OFFICE 2,291,694

SAFETY BOLSTER

Culous E. Cook, Magnolia, Tex.

Application November 22, 1940, Serial No. 366,585

9 Claims. (Cl. 214—85)

The invention relates to a safety bolster of the type used on vehicles in supporting loads of various types of articles, such as logs, pipe, etc.

In transporting articles such as indicated upon vehicles, it is very often necessary to unload the articles by releasing the side stakes which support the articles on the vehicle and bolster. It is dangerous to have a person release the stake from the side of the vehicle where the articles are to be unloaded because of the tremendous weight of the articles and the fact that if they are stacked on the vehicle the person releasing the stake is subject to injury. With this difficulty in mind the present invention contemplates a bolster having pivoted stakes which will be latched and locked in place but which can be released by a suitable mechanism from the opposite side of the vehicle. In this manner any injury to the person releasing the stakes is obviated.

Another object of the invention is to provide a latching mechanism for bolster stakes wherein the mechanism is confined entirely within the bolster.

Another object of the invention is to provide a bolster stake which will serve as a support or guide for the loading gear.

Still another object of the invention is to provide a combination bolster and stake which will serve as a support for both the skid and the loading gear.

Another object of the invention is to provide a bolster and pivot stake wherein the stake is attached to the bolster and positioned inside of the end of the bolster.

Other and further objects of the invention will be readily apparent when the following description is considered in connection with the accompanying drawings, wherein:

Fig. 6 shows a vehicle I which may be in the form of a truck or trailer having a frame or body 2. The front and rear body portions are connected with a coupling pole 3 so that the front and rear wheels are connected together.

Figure 5:
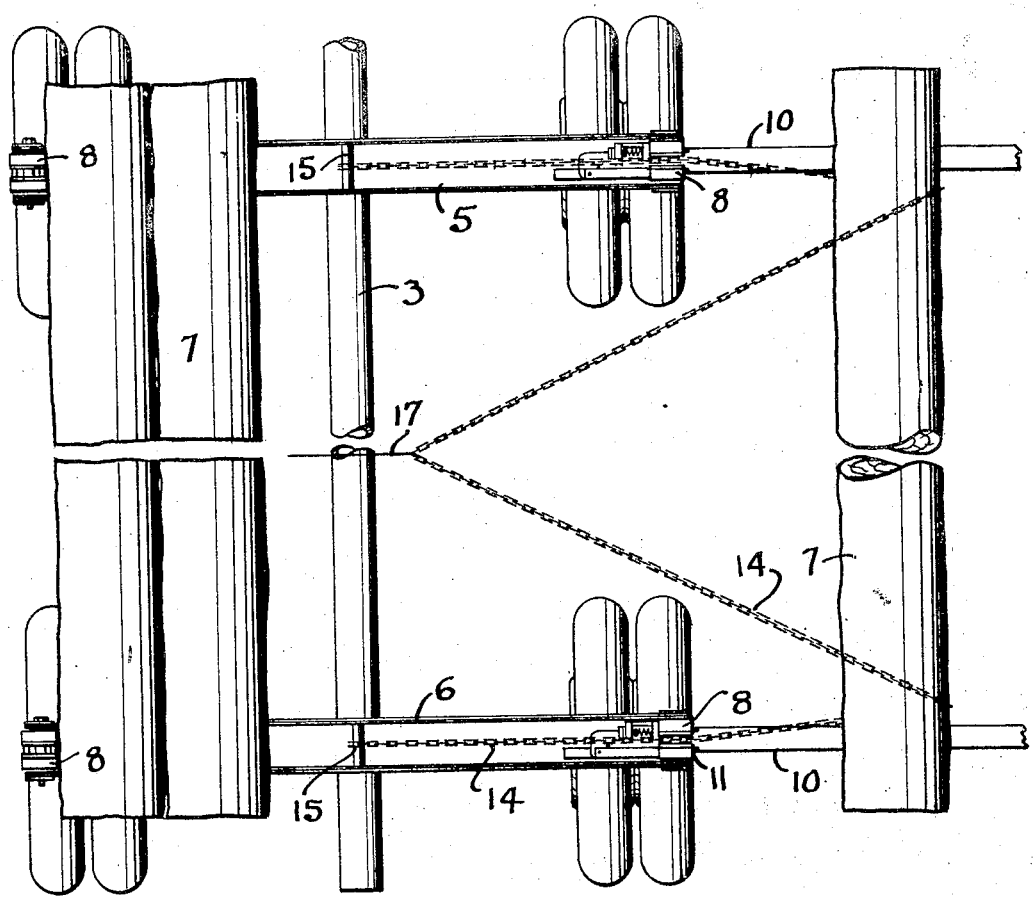
Fig. 5 is a top plan view looking down on the bolster as applied to a truck and illustrating the manner of loading logs with the loading gear passing over the stake of the bolster.

Fig. 5 shows a front bolster 5 and a rear bolster 6 which are preferably identical in construction. These bolsters are arranged to receive a plurality of articles 7 such as logs or pipe and these articles are confined upon the bolster by the stakes such as 8, one of which is pivoted at 9 to each end of the bolster, such as 5 or 6.

Figures 3, 4:
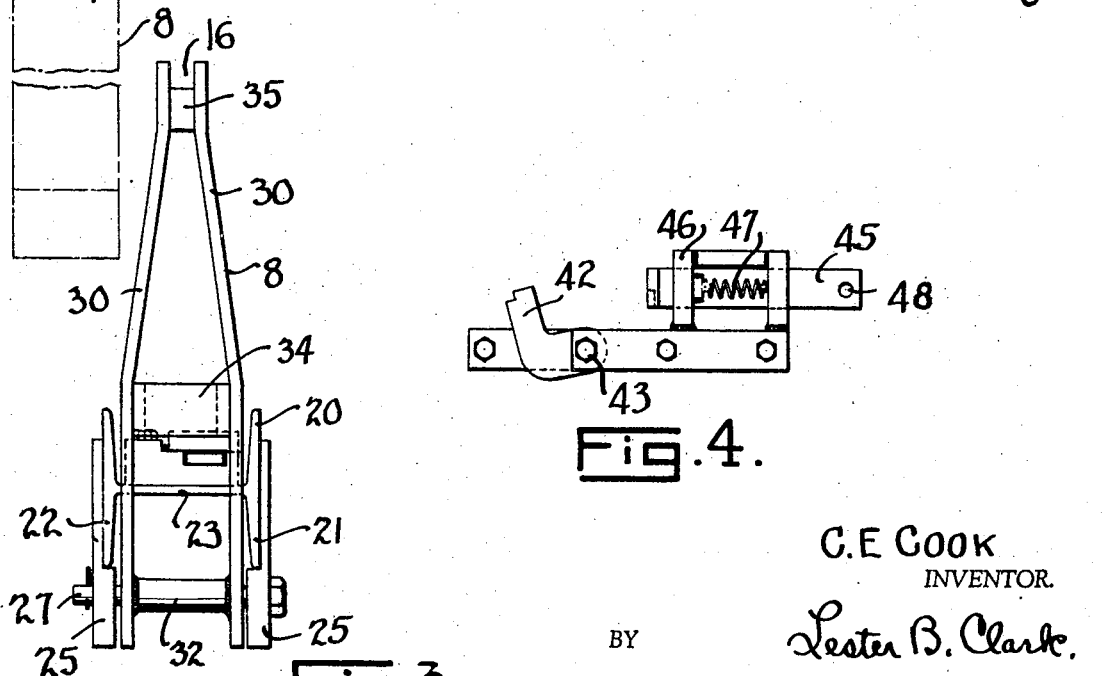
Fig. 3 is an end view of the bolster and stake construction.
Fig. 4 is a detailed view of the latch in released position.
Figure 6:
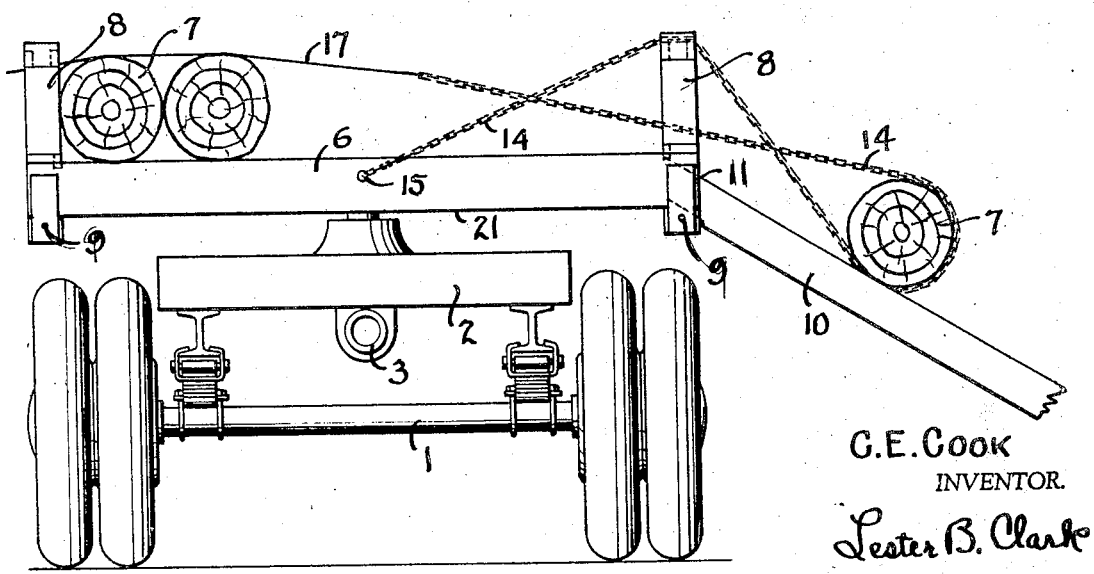
Fig. 6 is an end view of the structure of Fig. 5.

In loading the articles such as logs, Figs. 5 and 6 illustrate skids 10 which have one end positioned upon the ground or a suitable platform and have their upper ends 11 positioned in the stake 8 so as to form a support for the skid. In loading the articles 7 a loading gear illustrated generally as a chain 14 has one end 15 anchored to the body of the bolster 6. This chain passes over the top of the stake 8 and is positioned in a groove such as 16 which is best seen in Fig. 3. This chain then is passed underneath the log 7 and around the log back over the top of the vehicle.

Fig. 5 shows a double chain or cable which is passed underneath the log from each one of the bolsters 5 and 6. A pull line 17 is connected to the gear or chain and when a pull is exerted upon this line the log will be compelled to roll up the skids over the top of the stakes 8 and will drop down upon the bolster. In this manner any desired number of articles can be piled quickly and easily upon the vehicle.

When the articles are to be unloaded it is desirable for the stake on the appropriate side of the vehicle be released so that the articles may be rolled from the bolster. The structure Figures 1 to 4 inclusive illustrate the construction of the bolster, stake and the latching mechanism.

Fig. 3 shows that the bolster 6 is made up of an H-beam 20 which has the side flanges 21 and 22 and a central web 23. The beam is positioned on edge with the flanges in a vertical position and the web in a horizontal position.

Figure 1:
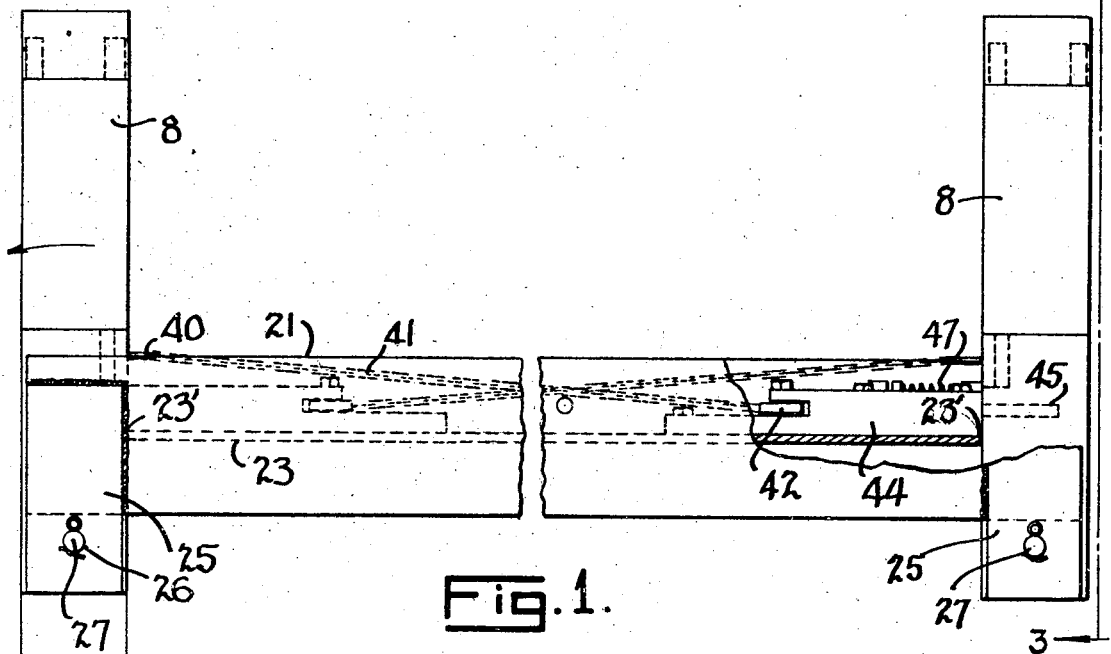
Fig. 1 is a side elevation of a bolster equipped with present invention and showing certain portions broken away to illustrate the latch.

In order to attach the stakes 8 to the beam the web 23 has been cut away for a short distance at each end to a point such as 23' seen in Fig. 1. This leaves an open space between the ends of the flanges 21 and 22 and the stake 8 is positioned in this space. A pair of braces or brackets 25 have been welded or otherwise affixed to the flanges 21 and 22 respectively, as best seen in Figs. 1 and 3. These braces or brackets extend below the lower edge of the flanges and have an opening 26 therein to receive the pivot pin or shaft 27. The stake 8 is made up of two side members or plates 30 which are identical and of a length to extend thru the bolster beam and above the beam the desired distance. A sleeve or hollow brace 32 has been affixed between the lower ends of the plates 30 so as to space them apart and to also form a housing for the pivot shaft 27. This sleeve 32 may also be used as a support for the inner end 11 of the skid 10 so that the skid may rest upon it without interfering with the shaft 27.

A center brace in the form of a plate 34 braces the intermediate portions of the plates 30 and this brace may also serve for a support for the upper end 11 of the skid if the skid is to be positioned higher up on the stake. The upper ends of the plates 30 are bent toward each other and are spaced apart by a block 35 which is positioned a short distance above the upper or top of the end of the stake. This block forms the bottom of the groove 16 and is arranged to serve as a support for the loading gear 14 as it passes over the top of the stake as seen in Figs. 5 and 6. It seems clear that this stake is thus pivoted below the bolster and may be pivoted so as to pass out of the way when the articles are being unloaded. It may assume the dotted line position of Fig. 1.

Figure 2:
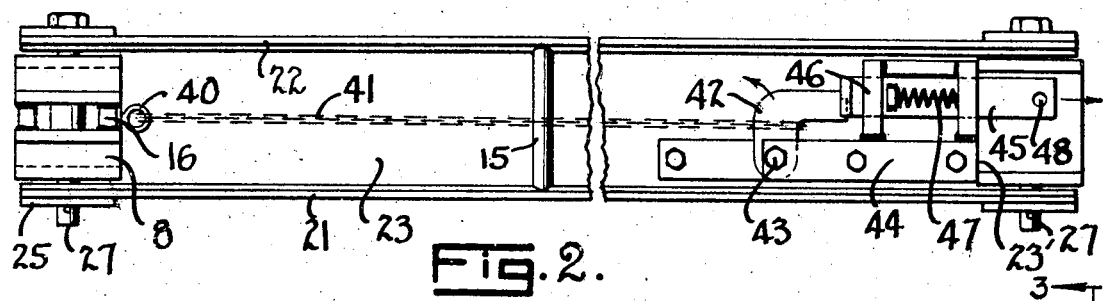
Fig. 2 is a top plan view looking down on the bolster and stake construction and illustrating the latch for retaining one of the stakes in upright position.

In order to hold the stake in an upright position to confine the articles on the bolster, a latching mechanism has been provided which is best seen in Figs. 2 and 4. A bolt or attaching lug 40 is connected to the inner edge of the stake 8 and may have a chain or cable 41 connected thereto. This chain or cable extends longitudinally of the H-beam of the bolster and as seen in Fig. 1 is within the confines of the flanges 21 and 22 so that the articles carried by the bolster will not interfere with this operation or damage the latching device. This cable or chain is of a length to pass over the link 42 pivoted at 43 on the anchor plate 44. These anchor plates are fixed to the web 23 of the beam and carry the pivoted link 42. In order to confine the link to the position of Fig. 2 wherein the chain 41 is held taut, a locking bar 45 is slidably mounted in the keeper 46 and is normally urged to the left as viewed in Fig. 2 by a spring 47. The end of this lock bar is recessed to receive the end of the link 42 so as to hold the link against turning movement. The end of the lock bar has a recess 48 therein to receive a suitable hook or tool for moving the bar to the right as seen in Fig. 2. The movement of this bar to the right causes it to release the link 42 so that a pull on the chain 41 due to the load on the stake 8 will cause the link to swing around in a counter-clockwise direction so as to release the chain 41. The latch is shown in released position in Fig. 4. The release of the chain 41 will allow the stake to pivot away from its vertical position so as to release the articles being carried. It should be noted that the inner latching mechanism is disposed within the confines of the bolster with no handles, brackets or rods exposed at the side of the bolster or at the end thereof where they might be damaged. This is one of the features of advantage of the latching mechanism because it is simple, economical and fool-proof.

Only one of the latches has been illustrated in Fig. 2 but both of the latches are shown in Fig. 1. It seems obvious that the latch is operated from the opposite side of the vehicle from the stake which is being released so that the operator is in no danger when the articles are released.

Broadly the invention contemplates a simple and economical bolster, loading gear and releasing mechanism.

What is claimed is:

1. A safety bolster for vehicles including an H beam mounted transversely of the vehicle, a stake pivoted at each end of said beam to stand upright or to pivot to a position below the beam, said pivot being disposed below the beam, and latch means to retain said stake upright including a flexible release member disposed within the flanges of the H beam and extending to the opposite end thereof.

2. A safety bolster for vehicles including an H beam mounted transversely of the vehicle, a stake pivoted at each end of said beam to stand upright or to pivot to a position below the beam, said pivot being disposed below the beam, and latch means to retain said stake upright including a flexible release member disposed within the flanges of the H beam and extending to the opposite end thereof, said release having a link and a lock member to retain said link.

3. A truck bolster including a structural steel beam having a web and flanges, a portion of said web being removed between the flanges at one end, a stake positioned between the flanges where said web was removed, a pivot for said stake attached to said flanges and disposed below the flanges so that said stake may swing to a point below the beam, and means to latch said stake in an upright position including a chain and release lock operable from the opposite end of the bolster and disposed completely within the outline of said beam.

4. In a truck bolster, a bolster beam, a stake pivoted thereon, said stake including a pair of side members, and means joining the upper ends of said members but spaced below the tops thereof so as to provide a guide slot for the loading gear so that articles being loaded may be elevated and passed over the top of the stake by said gear.

5. A truck bolster and loading gear including a structural steel beam, a stake pivoted to swing at one end thereof, a latch to retain said stake upright, a loading gear including a cable or chain element having one end affixed to said beam, a slot in the top of said stake to receive said element, and a skid leaning on said stake so that an article being loaded may be rolled up said skid and over the top of said stake to be deposited on the bolster by a pull on the free end of said element.

6. A truck bolster and loading gear including a structural steel beam, a stake pivoted to swing at one end thereof, a latch to retain said stake upright, a loading gear including a cable or chain element having one end affixed to said beam, a slot in the top of said stake to receive said element, and a skid leaning on said stake so that an article being loaded may be rolled up said skid and over said stake by a pull on the free end of said element, said stake having two portions either one of which may receive the end of said skid.

7. A bolster stake including a pair of spaced side plates, a pivot brace affixed between the plates adjacent one end, and a spacer block affixed between the plates adjacent the other end so as to provide a groove at the top of the stake between the plates to receive the loading gear.

8. A truck bolster stake latch device including a pivoted stake, a lug connected to said stake, a spring pressed latch bar engaging said lug to hold the stake in upright position and confining the load on the bolster, and means on the opposite end of the bolster to exert a pull on said latch bar to release said lug so that the stake may pivot to load releasing position below the bolster.

9. A truck bolster stake latch device including a pivoted stake, a lug connected to said stake, a spring pressed latch bar engaging said lug to hold the stake in upright position and confining the load on the bolster, and means on the opposite end of the bolster to exert a pull on said latch bar to release said lug so that the stake may pivot to load releasing position below the bolster, all of said latch device being disposed for protection within the outline of said bolster.

CULOUS E. COOK.